United States Patent [19]

Lin

[11] Patent Number: 5,412,508
[45] Date of Patent: May 2, 1995

[54] COMPACT ZOOM LENS SYSTEM

[75] Inventor: Chieh-Yu Lin, Chung-Ho City, Taiwan, Prov. of China

[73] Assignee: Industrial Technology Research Institute, Chutung, Taiwan, Prov. of China

[21] Appl. No.: 90,509

[22] Filed: Jul. 13, 1993

[51] Int. Cl.[6] .................... G02B 15/14; G02B 13/18
[52] U.S. Cl. .................................. 359/692; 359/714
[58] Field of Search ............................ 359/692, 714

[56] References Cited
U.S. PATENT DOCUMENTS
5,126,884 6/1992 Sato ...................................... 359/692

Primary Examiner—Scott J. Sugarman
Attorney, Agent, or Firm—W. Wayne Liauh

[57] ABSTRACT

A zoom lens system consists of five lens elements arranged in two groups. Counting from the object side, the first three elements form a front lens group with positive refracting power and the last two elements form a rear lens group with negative refracting power. An airspace is reserved between the front lens group and the rear lens group and it is made variable for zooming. The first lens element in the front lens group is a negative meniscus lens element having its concave lens surface directed toward the object side. Both the second and third lenses in the front lens group are positive lens element. The fourth lens in the rear lens group is positive meniscus lens element, and the fifth lens is a lens element with negative refracting power. In the lens composition, both the front lens group and the rear lens group at least include an aspherical surface respectively.

9 Claims, 7 Drawing Sheets

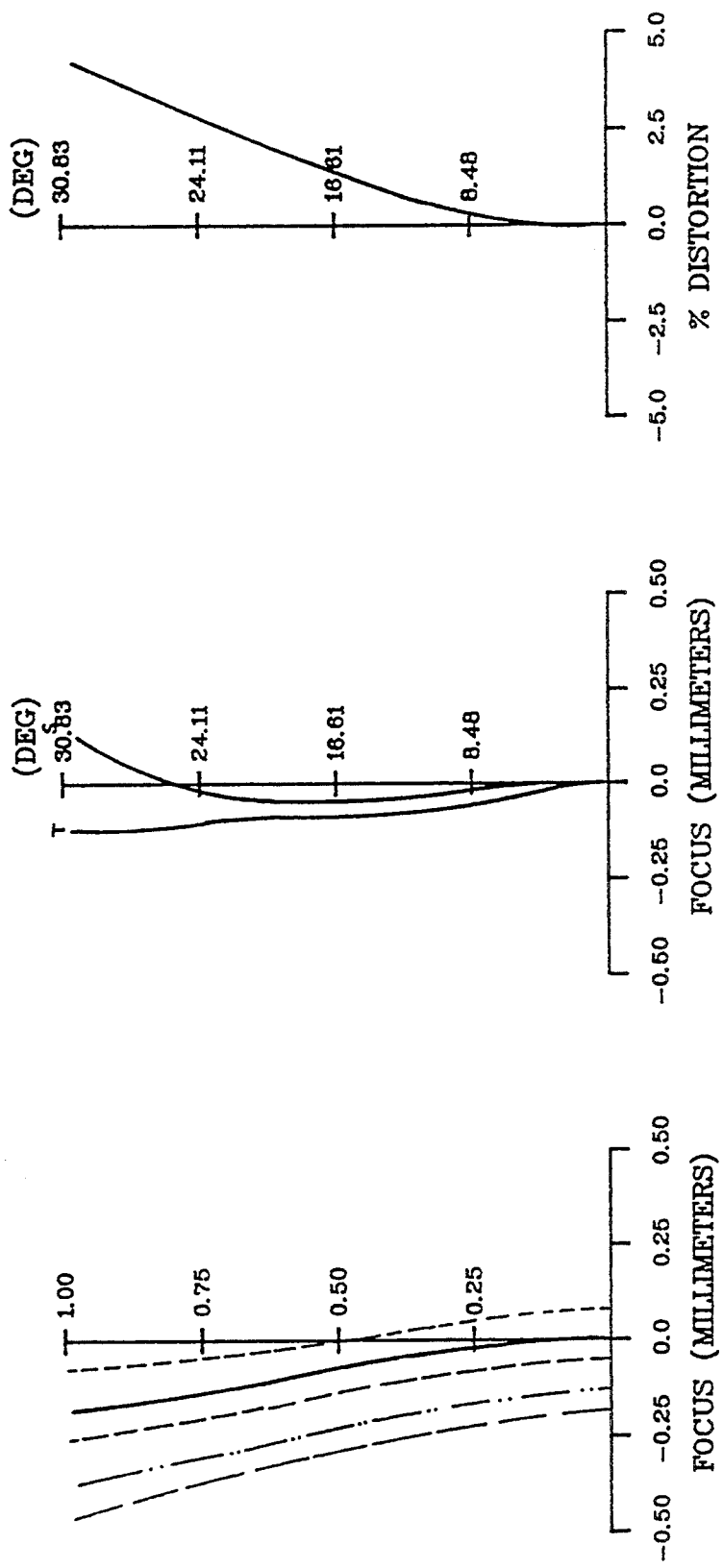

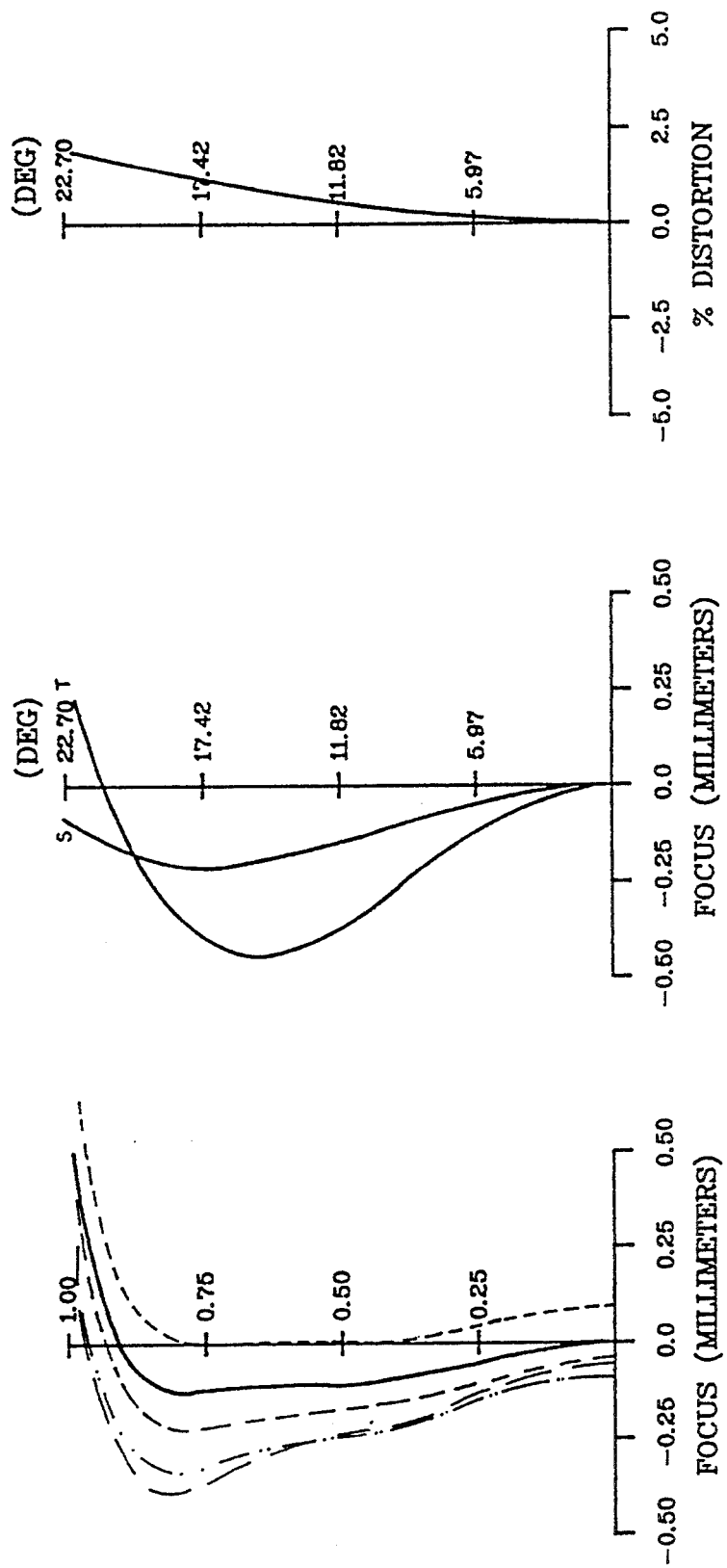

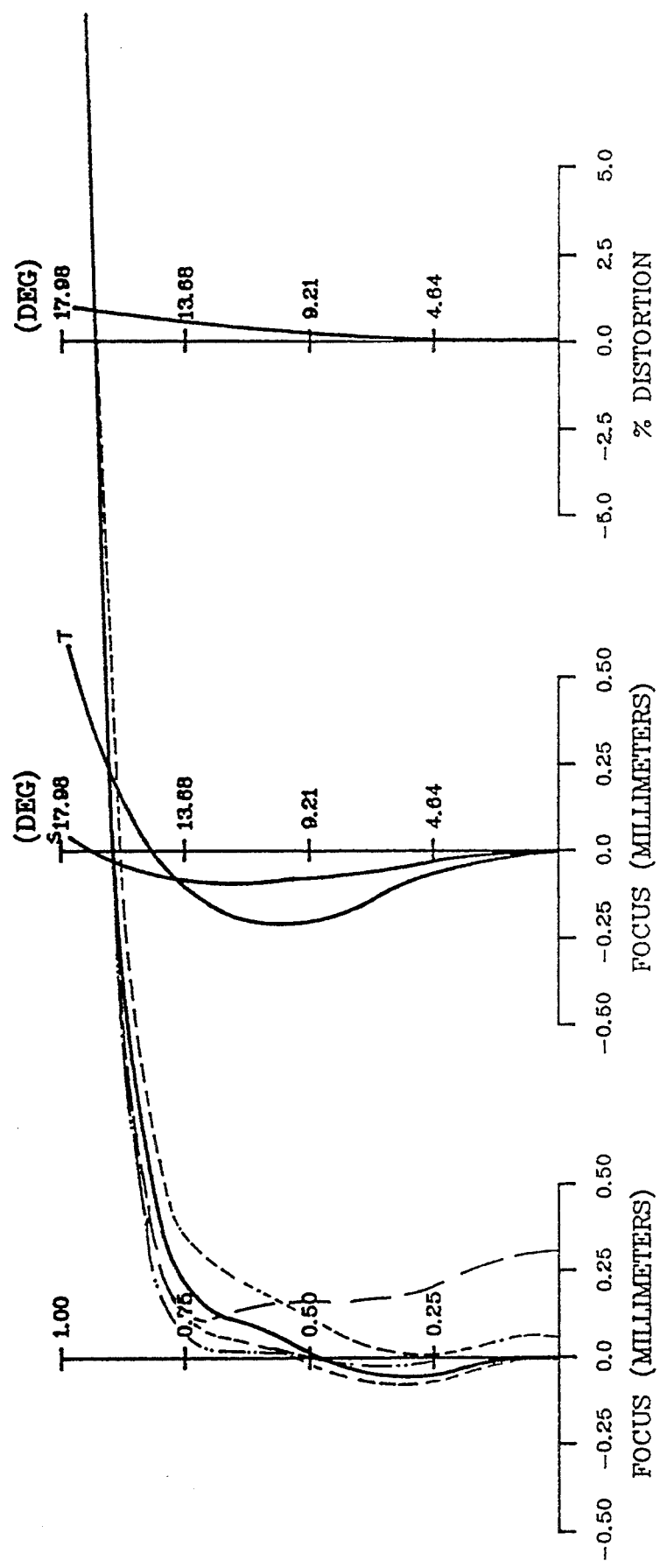

COMPACT ZOOM LENS SYSTEM

BACKGROUND OF THE INVENTION

The present invention relates to a zoom lens system, and more particularly to a compact zoom lens system suitable for a lens shutter camera. The lens system is composed of five lens elements with features of high zoom ratio, short total length, and high quality.

Zoom lens systems are generally classified into two categories. The first category is the so-called retrofocus type zoom lens system, which typically consists of a front lens group having negative refractive power and a rear lens group having positive refractive power. An air separation is reserved between the front lens group and the rear lens group. It is possible to change the focal length of the lens system by varying the air separation between the two lens groups. The main feature of this lens type is that it has an enough space to arrange a reflection mirror, so that it is suitable to be used in a well-known single lens reflex camera. However, it has disadvantages in that the system has a long back focal length, thereby making it impossible to shorten the total length, and comprises the front lens having a large diameter, thereby making it impossible to make said zoom lens system compact.

The second category of zoom lens system is the so-called telephoto system which comprises a front lens group having positive refractive power and a rear lens group having negative refractive power. An airspace is also reserved between the front lens group and the rear lens group to vary the focal length of the lens system during zooming operation. This type of zoom lens system is characterized by a shorter back focal length, relative to the retrofocus type. The shorter back focal length makes it possible to shorten the total length of the zoom lens system. The telephoto lens system is especially suitable for use in a lens shutter camera.

It is intended to compact the zoom lens system to a smaller outside diameter, less lens element, and shorter total length. In addition, it is preferred to increase the zoom ratio of the lens system without decreasing the quality and making longer the total length of the lens system.

Various prior patents had been developed in this field. For example, U.S. Pat. No. 4,838,669 disclosed a zoom lens system having positive refractive power and a rear lens group having negative refractive power. The front lens group of the lens system consists of a positive meniscus lens, a negative lens, and at least one positive lens. The rear lens group of the lens system consists of a positive lens, a biconcave lens, and a negative meniscus lens.

U.S. Pat. No. 4,991,945 disclosed a zoom lens comprising five lens elements. The first three elements form a positive lens group and the last two elements form a negative lens group. In the front lens group, the first lens is a positive lens element, the second lens is a negative lens element, and the third lens is a positive lens element. In the rear lens group, the fourth lens is a positive lens element, and the fifth lens is a negative lens element.

SUMMARY OF THE INVENTION

The primary object of the present invention is to provide a miniature zoom lens system with advantages of small outside diameter, short total length, less lens element, high zoom ratio, and good quality. The lens system is especially suitable to be used in a compact 35 mm lens shutter type camera.

The other object of the present invention is to provide a compact zoom lens system comprising only five lens elements. In this system the first three elements form a positive front lens group and the last two elements form a negative rear lens group. An airspace is reserved between the front lens group and the rear lens group, and it is made variable to effect zooming.

To achieve the objects above, counting from the object side of the lens system, the first three elements form a front lens group with positive refracting power and the last two elements form a rear lens group with negative refracting power. The first lens element in the front lens group is a negative meniscus lens element having its concave lens surface directed toward the object side. Both the second and third lens in the front lens group are positive lens element. The fourth lens in the rear lens group is a positive meniscus lens element, and the fifth lens is a negative meniscus lens element.

Further, in the preferred embodiment of the present invention, both the front lens group and the rear lens group at least comprise an aspherical lens surface respectively.

The other objects and features of the invention will become more apparent from the following description taken in connection with the accompanying drawings.

BRIEF DESCRIPTION OF THE DRAWINGS

FIG. 2A shows a longitudinal spherical aberration of the present invention in wide angle position;

FIG. 2B shows astigmatic field curves of the present invention in wide angle position;

FIG. 2C shows a distortion curve of the present invention in wide angle position;

FIG. 3A shows a longitudinal spherical aberration of the present invention in intermediate focal length;

FIG. 3B shows astigmatic field curves of the present invention in intermediate focal length;

FIG. 3C shows a distortion curve of the present invention in intermediate focal length;

FIG. 4A shows a longitudinal spherical aberration of the present invention in telephoto position;

FIG. 4B shows astigmatic field curves of the present invention in telephoto position; and FIG. 4C shows a distortion curve of the present invention in telephoto position.

DETAILED DESCRIPTION OF THE INVENTION

Figure 1:
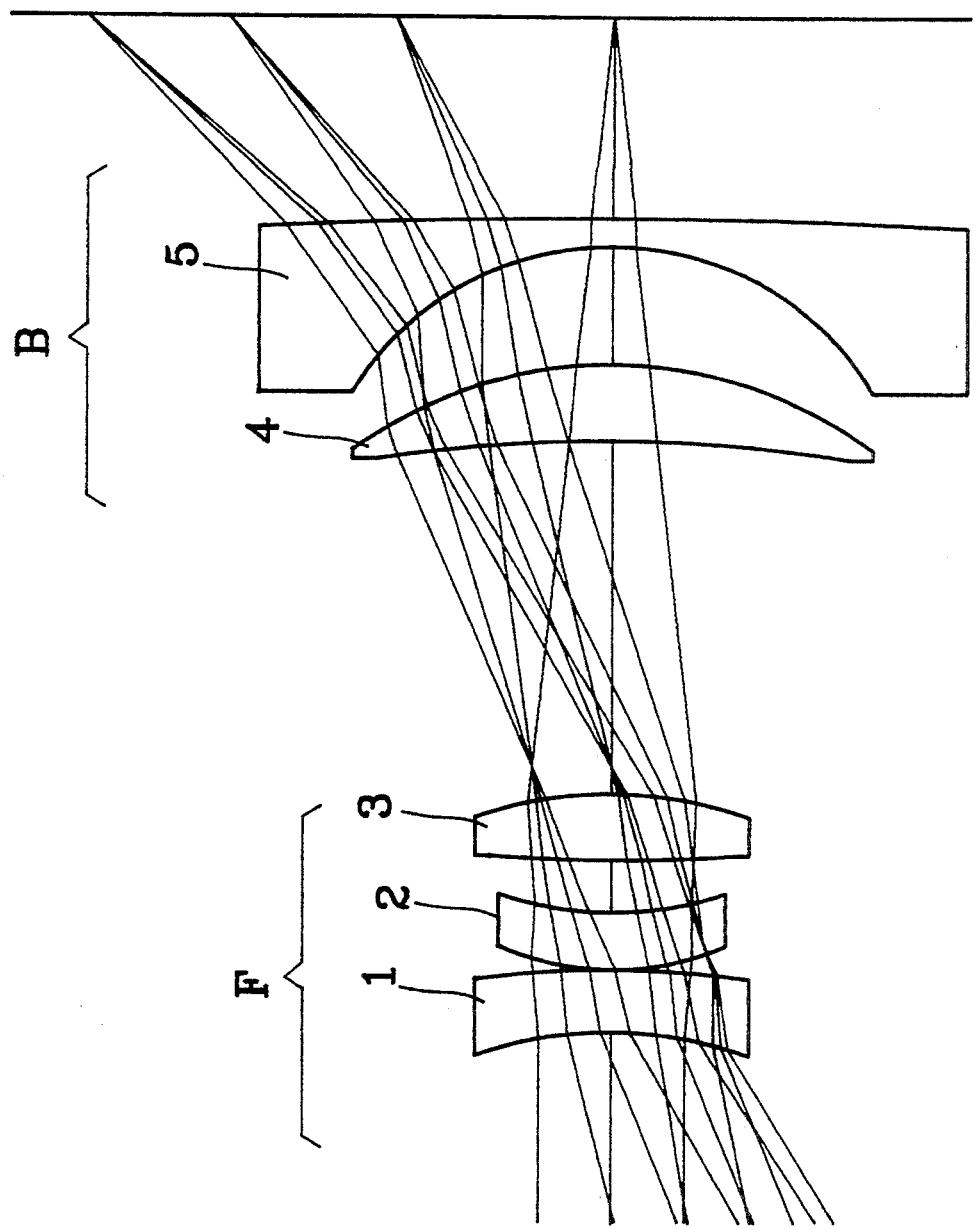
FIG. 1 illustrates a zoom lens composition with rays through the lens elements in accordance with the present invention.

Referring now to FIG. 1, it shows an optical schematic view illustrating a zoom lens composition of the present invention. The lens system is composed of five lens elements 1, 2, 3, 4 and 5 forming an optical lens system. In the order from the object side (left side) to the image plane(right side), the first three lens elements 1, 2, and 3 form a front lens group F(first lens group)

and the last two lens elements 4 and 5 form a rear lens group R(second lens group). The front lens group F has a feature of positive refractive power while the rear lens group has a feature of negative refractive power. An airspace SP is reserved between the front lens group F and the rear lens group R, and it is made variable to change the focal length of the lens system so as to effect zooming operation.

Figure 2:
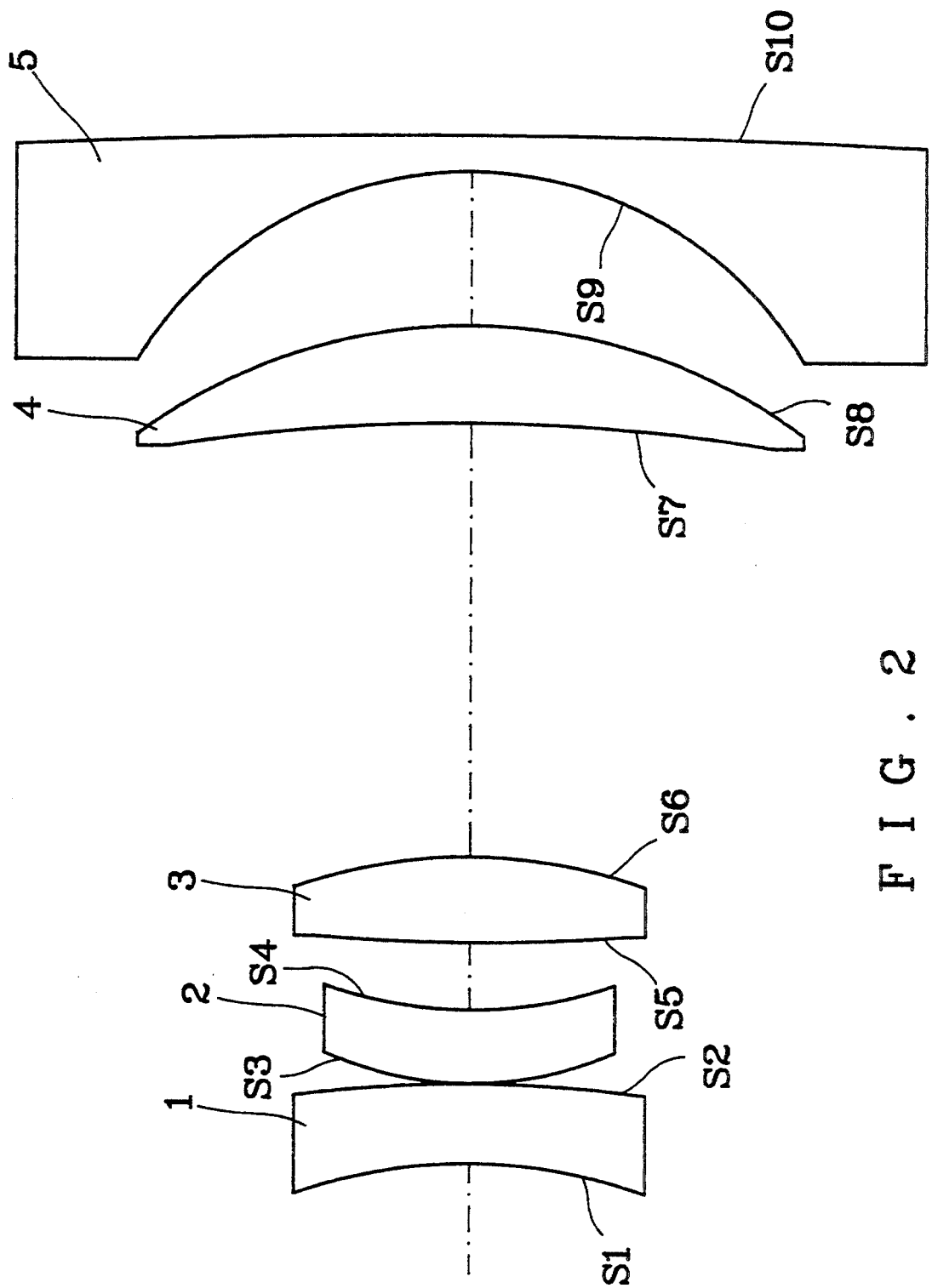
FIG. 2 shows a schematic view of a zoom lens composition of the present invention in wide angle position.

FIG. 2 is a schematic view of the lens composition of the present invention in wide angle operation. Counting from the object side to the image side along the optical axis of the lens compositions, the first lens element 1 of the front lens group F is a negative meniscus lens having its concave surface directed toward the object side of the lens system. That is, the lens element adjacent to the object side of the lens system has a feature of negative refractive power. The second lens element 2 is a positive lens, and the third lens elements 3 is also a positive lens. Therefore, the first lens element 1, the second lens element 2, and the third lens element 3 in combination constitute the front lens group F of the present invention.

In the preferred embodiment of the present invention, the second lens elements 2 in the front lens group F is a positive meniscus lens having its convex surface directed toward the object side of the lens system, and the third lens element 3 is an aspherical lens.

In the rear lens group B, the fourth lens element 4 is a positive lens having its concave surface directed toward the object side of the lens system, and the fifth lens element 5 is a negative lens having its concave surface directed toward the object side of the lens system.

Counting from the object side of the lens composition as shown in FIG. 2, the reference symbols S1–S11 are defined as follows: S1, S2 represent the opposite surface number of the first lens element 1 respectively; S3, S4 represent the opposite surface number of the second lens element 2 respectively; S5, S6 represent the opposite surface number of the third lens element 3 respectively; S7, S8 represent the opposite surface number of the forth lens element 4 respectively; and S9, S10 represent the opposite surface number of the fifth lens element 5 respectively.

The lens system of the present invention is designed to satisfy the following conditions:

$$-0.8 < R1/fw < -0.3 \quad (1)$$

$$0.5 < f1/fw < 1.0 \quad (2)$$

wherein:
R1 represents the radii of the first lens element;
fw represents the focal length of the lens system in widest angle operation mode;
f1 represents the focal length of the first lens element in the front lens group.

The relative position of the lens elements of the present invention in wide angle position is illustrated in FIG. 2, and the aberration characteristics of the lens system in wide angle position are illustrated in FIGS. 2B, and 2C.

FIG. 2A shows the longitudinal spherical aberration of the present invention in wide angle position. The X-axis represents the displacement of the focus (millimeters) along the optical axis of the lens system, and the Y-axis represents the observation field from a range 0–1.0. The present five curves as illustrated in the drawing show the various spherical aberration at different wavelengths.

FIG. 2B shows the astigmatic field curves of the present invention in wide angle position. The X-axis represents the displacement of the focus plane along the optical axis of the lens system, and the Y-axis represents the observation angle of the lens system from a range 0 to a maximum angle 30.83 degrees. The curves S and T as illustrated in the drawing represent the change of the tangential and sangittal respectively. The astigmatism of the lens system may be obtained from the displacement of the curves S and T.

FIG. 2C shows a distortion curve of the present invention in wide angle position. The X-axis represents the percentage of the distortion, and the Y-axis represents the observation angle of the lens system from a range of 0 to a maximum angle 30.83 degrees.

Figure 3:
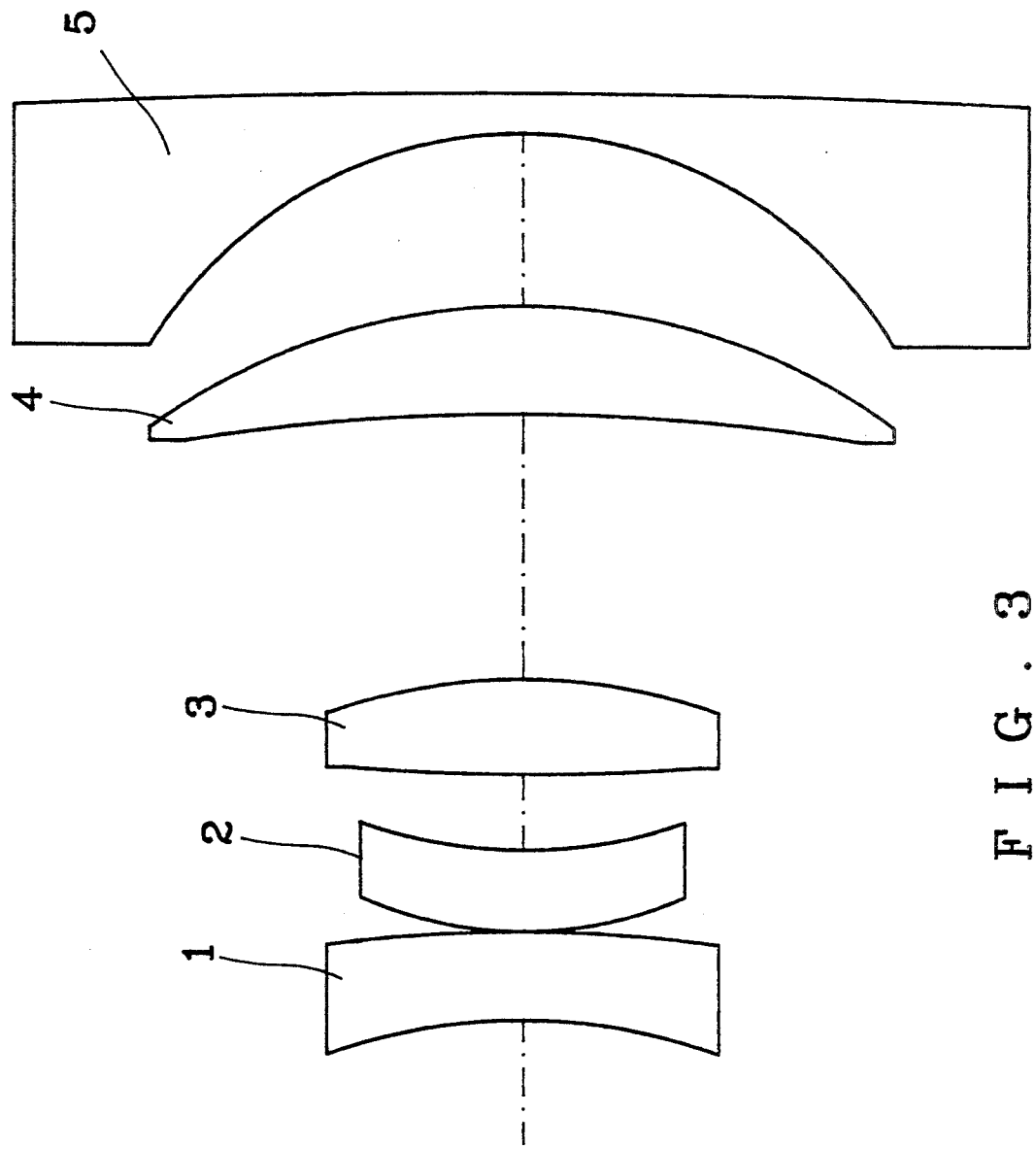
FIG. 3 shows a schematic view of a zoom lens composition of the present invention in intermediate focal length.

The relative position of the lens elements of the present invention in intermediate focal length position is illustrated in FIG. 3. It is noted that the air reservation between the third lens element 3 and the fourth lens element 4 is narrower, compared with the air reservation shown in FIG. 2 operated in wide angle position. The aberration characteristics of the lens system in wide angle position are illustrated in FIGS. 3A, 3B, and 3C.

FIG. 3A shows the longitudinal spherical aberration of the present invention in intermediate focal length position. The X-axis represents the displacement of the focus (millimeters) along the optical axis of the lens system, and the Y-axis represents the observation field from a range 0–1.0. The present five curves as illustrated in the drawing show the various spherical aberration at different wavelengths.

FIG. 3B shows the astigmatic field curves of the present invention in intermediate focal length position. The X-axis represents the displacement of the focus plane along the optical axis of the lens system, and the Y-axis represents the observation angle of the lens system from a range 0 to a maximum angle 30.83 degrees. The curves S and T as illustrated in the drawing represent the change of the tangential and sangittal respectively. The astigmatism of the lens system may be obtained from the displacement of the curves S and T.

FIG. 3C shows a distortion curve of the present invention in intermediate focal length position. The X-axis represents the percentage of the distortion, and the Y-axis represents the observation angle of the lens system from a range of 0 to a maximum angle 30.83 degrees.

Figure 4:
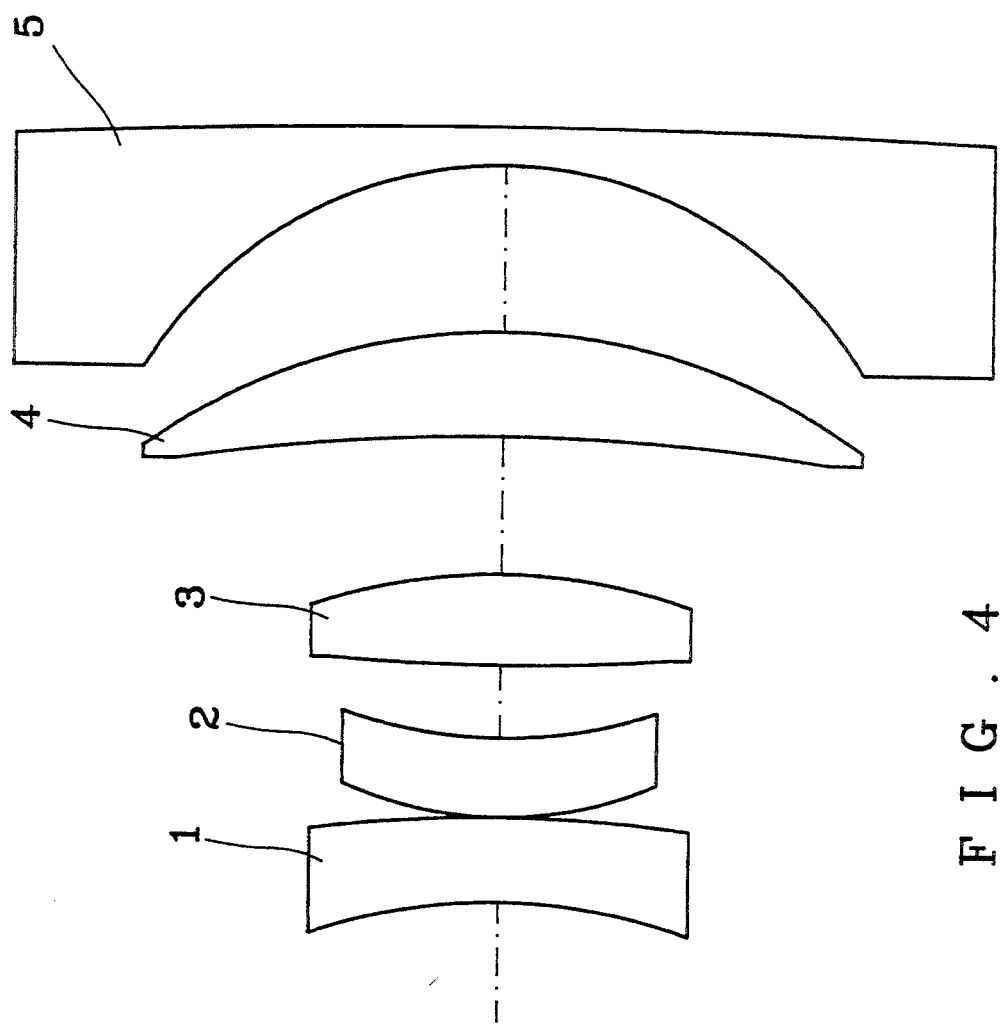
FIG. 4 shows a schematic view of a zoom lens composition of the present invention in telephoto position.

The relative position of the lens elements of the present invention in telephoto position is illustrated in FIG. 4. It is noted that the air reservation between the third lens element 3 and the fourth lens element 4 is the narrowest, comparing with the air reservation shown in FIG. 2 operated in wide angle position and FIG. 3 operated in intermediate focal length position. The aberration characteristics of the lens system in telephoto angle position are illustrated in FIGS. 4A, 4B, and 4C.

FIG. 4A shows the longitudinal spherical aberration of the present invention in telephoto position. The X-axis represents the displacement of the focus (millimeters) along the optical axis of the lens system, and the Y-axis represents the observation field from a range 0–1.0. The present five curves as illustrated in the drawing show the various spherical aberration at different wavelengths.

FIG. 4B shows the astigmatic field curves of the present invention in telephoto position. The X-axis represents the displacement of the focus plane along the optical axis of the lens system, and the Y-axis represents the observation angle of the lens system from a range 0 to a maximum angle 30.83 degrees. The curves S and T as illustrated in the drawing represent the change of the tangential and sangittal respectively. The astigmatism of the lens system may be obtained from the displacement of the curves S and T.

FIG. 4C shows a distortion curve of the present invention in telephoto position. The X-axis represents the percentage of the distortion, and the Y-axis represents the observation angle of the lens system from a range of 0 to a maximum angle 30.83 degrees.

In the front lens group F of the preferred embodiment of the present invention, the third lens element 3 at least comprises an aspherical surface. In the rear lens group B, it also at least comprises an aspherical surface. The feature of the aspherical surface may be indicated by the following equation:

$$Z = \frac{(CURV)\, Y^2}{1 + [1 - (1 + k)(CURV)^2 Y^2]^{\frac{1}{2}}} + AY^4 + BY^6 + CY^8 + DY^{10}$$

wherein
Z represents the sag of the lens parallel to the Z axis
CURV represents the curvature at the pole of the surface
K represents the Konic Coefficient
Y represents the height of the lens from the optical axis of the lens system
A represents the 4th order deformation coefficient
B represents the 6th order deformation coefficient
C represents the 8th order deformation coefficient
D represents the 10th order deformation coefficient With reference to FIG. 2, the numerical data of the preferred embodiment of the zoom lens system in accordance with the present invention are listed as follows:

Preferred EMBODIMENT:
f = 36–66.7    F No. 5.5–7.4

| i | ri | di | ni | vi |
|---|---|---|---|---|
| S1 | −14.6948 | 2.3661 | 1.754 | 27.6 |
| S2 | −33.6339 | 0 | | |
| S3 | 10.3686 | 2.2313 | 1.508 | 59.4 |
| S4 | 14.0592 | 1.8556 | | |
| S5 | 34.54439 | 2.6462 | 1.491 | 57.1 |
| S6 | −15.0073 | 13.0654 | | |
| S7 | −62.4230 | 3 | 1.491 | 57.1 |
| S8 | 23.39927 | 4.6983 | | |
| S9 | −11.5845 | 1 | 1.636 | 57.1 |
| S10 | −267.0023 | | | |

| f | 36 | 51 | 66.7 |
|---|---|---|---|
| d6 | 13.0654 | 6.9978 | 3.8013 | wherein
f represents the focal length of the lens system;
i represents the respective lens surface of the lens composition;
ri represents the radii of curvature of respective lens surfaces;
di represents the distance between the respective lens surfaces along the optical axis of the lens system;
ni represents the refractive index of the respective lens elements;
vi represents the Abbe's Number of respective lens elements.

| S | CURV | K | A | B | C | D |
|---|---|---|---|---|---|---|
| A5 | 0.02894826 | −29.895477 | −7.95680E-05 | −3.47716E-06 | 1.18798E-07 | −3.03034E-09 |
| A8 | −0.04273638 | 3.366620 | −8.55497E-06 | −6.66297E-11 | −2.41659E-09 | 1.27578E-11 |

The zoom lens system of the present invention as described above only comprises five lens elements with advantages of smaller outside diameter and shorter total length. In addition, it is possible to obtain a high zoom ratio without leading the long total length of the lens system. In application, the present invention is especially applied in a compact 35 mm lens shutter camera.

The feature of the preferred embodiment of the present invention has been described. It will be obvious to those skilled in the art to use this invention according to the above detailed description. While the arrangement herein described constitutes a preferred embodiment of this invention, it is to be understood that various changes and modifications may be made therein without departing from the scope and spirit of the invention as defined in the appended claim.

I claim:

1. A zoom lens system consisting of:
   a front lens group with positive refracting power and a rear lens group with negative refracting power, counting from the object side of the lens system; and
   airspace between said front and rear lens groups being made variable to effect zooming;
   wherein said front lens group consisting of in order from the object side, a negative lens element and two positive lens elements arranged at the image side of said negative lens element, and the rear lens group consisting of a positive lens element and a negative lens element.

2. A lens system as claimed in claim 1 wherein, counting from the object side, the first lens element in the front lens group is a negative meniscus lens.

3. A lens system as claimed in claim 1 wherein, counting from the object side, the first lens element in the front lens group is a negative meniscus lens with its concave surface directed toward the object side of the lens system.

4. A lens system as claimed in claim 1, wherein the positive lens element in the rear lens group is a positive meniscus lens with its concave surface directed toward the object side of the lens system.

5. A lens system as claimed in claim 1, wherein the negative lens element in the rear lens group is a negative meniscus lens with its concave surface directed toward the object side of the lens system.

6. A lens system as claimed in claim 1 wherein, counting from the object side, the first lens element in the front lens group is a negative meniscus lens with its concave surface directed toward the object side of the lens system and at least one lens element of the two positive lens elements is a positive meniscus lens.

7. A lens system as claimed in claim 6, wherein the front lens group comprises at least a positive lens element having an aspherical surface.

8. A lens system as claimed in claim 6, wherein the rear lens group comprises at least a positive lens element having an aspherical surface.

9. A lens system as claimed in claim 6 which is designed to satisfy the following conditions:

$$-0.8 < R1/fw < -0.3 \quad (1)$$

and $$0.5 < f1/fw < 1.0 \quad (2)$$

wherein:
R1 represents the radii of the first lens element;
fw represents the focal length of the lens system in widest angle position; and
f1 represents the focal length of the first lens element in the front group.

* * * * *